(12) United States Patent
Lee et al.

(10) Patent No.: US 10,056,772 B2
(45) Date of Patent: Aug. 21, 2018

(54) WIRELESS CHARGING DEVICE

(71) Applicant: Hyundai Motor Company, Seoul (KR)

(72) Inventors: Woo Young Lee, Gyeonggi-do (KR); Si Hun Yang, Gyeonggi-do (KR); In Yong Yeo, Gyeonggi-do (KR); Tae Jong Ha, Seoul (KR); Gyu Yeong Choe, Gyeonggi-Do (KR); Hyun Wook Seong, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 14/922,135

(22) Filed: Oct. 24, 2015

(65) Prior Publication Data

US 2016/0336776 A1 Nov. 17, 2016

(30) Foreign Application Priority Data

May 11, 2015 (KR) ........................ 10-2015-0065101

(51) Int. Cl.
*H02J 7/00* (2006.01)
*H02J 7/02* (2016.01)
*H02J 50/10* (2016.01)

(52) U.S. Cl.
CPC ............ *H02J 7/0042* (2013.01); *H02J 7/025* (2013.01); *H02J 50/10* (2016.02)

(58) Field of Classification Search
CPC .................................................. H02J 7/0042
USPC ....................................................... 320/108
See application file for complete search history.

(56) References Cited

U.S. PATENT DOCUMENTS

| 6,049,191 A * | 4/2000 | Terazoe ................. H02J 7/025 320/108 |
| 6,891,738 B2 * | 5/2005 | Mihara ................. H02M 1/425 219/716 |
| 6,977,484 B1 * | 12/2005 | Peng ..................... H02J 7/0042 320/137 |
| 9,655,288 B2 * | 5/2017 | You ....................... H02J 7/0042 |
| 2004/0257187 A1 * | 12/2004 | Drummond ............ H01F 27/22 336/61 |
| 2008/0079524 A1 * | 4/2008 | Suzuki .................... H01F 27/22 336/61 |
| 2012/0126631 A1 * | 5/2012 | Amma .................... H02J 5/00 307/104 |

FOREIGN PATENT DOCUMENTS

| KR | 10-2007-0080057 | | 8/2007 |
| KR | 1020070080057 | * | 8/2007 |
| KR | 10-2012-0005827 A | | 1/2012 |
| KR | 10-2014-0010977 A | | 1/2014 |

* cited by examiner

*Primary Examiner* — Samuel Berhanu
*Assistant Examiner* — Tessema Kebede
(74) *Attorney, Agent, or Firm* — Mintz Levin Cohn Ferris Glovsky and Popeo, P.C.; Peter F. Corless

(57) ABSTRACT

Disclosed herein is a wireless charging device including a heat radiation panel having a radiation plate and a radiation fin protruding from an upper surface of the radiation plate; a core section arranged in a region other than the protruding radiation fin, the core section being made of a material having high permeability; and a coil section arranged on the core section so as to come into contact with the protruding radiation fin.

6 Claims, 4 Drawing Sheets

WIRELESS CHARGING DEVICE

CROSS-REFERENCE TO RELATED APPLICATION

The present application claims the benefit of and priority to Korean Patent Application No. 10-2015-0065101 filed on May 11, 2015, the entire contents of which being incorporated herein for all purposes by reference.

BACKGROUND OF THE DISCLOSURE

Technical Field

Embodiments of the present disclosure relate generally to a wireless charging device and, more particularly, to a wireless charging device, which is applied to a primary coil for generating a magnetic field for power transfer in a wireless charging system and a secondary coil for generating an induced electromotive force through the magnetic field generated by the primary coil, thereby having an efficiency heat dissipation structure.

Description of Related Art

Wireless charging techniques involve wireless power transfer in order to charge a battery in a state in which the individual contact terminals of a battery are not in contact with a charging device. Until now, wireless charging techniques have been mainly applied to the charging of small-capacity batteries of portable electronic devices, such as mobile terminals or PDAs. However, these techniques have been recently applied to applications required for transfer of high electric power in order to charge batteries of electric vehicles or plug-in hybrid vehicles, as an example.

These wireless charging techniques are based on a basic concept that electric power is transmitted and received using electromagnetic induction or resonance To this end, it is necessary for a wireless charging device to have coils provided in a power transmission side and a power reception side. Typically, wireless charging devices for charging electric vehicles or plug-in hybrid vehicles must have large-capacity batteries and perform high power transfer to reduce charging time. For this reason, the size of the devices may be increased and significant heat may be generated.

Conventional wireless charging devices have a simple structure in which the lower surface of a core section comes into surface contact with the upper surface of a heat radiation panel. Accordingly, the largest amount of heat is actually generated by a coil section, and the heat is emitted through only the core section. Thus, the conventional wireless charging devices may not directly transfer the heat generated by the coil section to the heat radiation panel, and may transfer the heat to the heat radiation panel through only the core section as a heat transfer medium. Therefore, the cooling performance of the wireless charging device may significantly deteriorate.

SUMMARY OF THE DISCLOSURE

Embodiments of the present disclosure are directed to a wireless charging device capable of efficiently dissipating heat generated by a primary coil for generating a magnetic field for power transfer and a secondary coil for generating an induced electromotive force through the magnetic field generated by the primary coil.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with embodiments of the present disclosure, a wireless charging device includes: a heat radiation panel having a radiation plate and a radiation fin protruding from an upper surface of the radiation plate; a core section arranged in a region other than the protruding radiation fin, the core section being made of a material having high permeability; and a coil section arranged on the core section so as to come into contact with the protruding radiation fin.

The core section may come into contact with a side surface of the radiation fin, and the coil section may come into contact with an upper surface of the radiation fin.

The radiation fin may be configured as a plurality of radiation fins, each having a hexahedral shape.

The core section may come into contact with side surfaces of the plurality of hexahedral radiation fins, and the coil section may come into contact with upper surfaces of the plurality of hexahedral radiation fins.

The radiation fin may be configured as a plurality of radiation fins, arranged at regular intervals in parallel with each other in a strip form.

The core section may include a plurality of blocks, each having a width corresponding to a distance between the plurality of radiation fins arranged in the strip form.

An upper surface of the radiation fin and an upper surface of the core section may form the same single surface.

A plurality of regions of the coil section may come into contact with the radiation fin.

Furthermore, in accordance with embodiments of the present disclosure, there is provided a wireless charging device configured such that a core section made of a material with high permeability is arranged on an upper surface of a radiation plate formed with a protruding radiation fin, a coil section is arranged on the core section, the core section comes into contact with a side surface of the protruding radiation fin, and the coil section comes into contact with an upper surface of the protruding radiation fin, thereby allowing heat generated by the coil section and heat transferred to the core section to be easily transferred to the radiation plate.

DETAILED DESCRIPTION OF EMBODIMENTS

Figure 1:
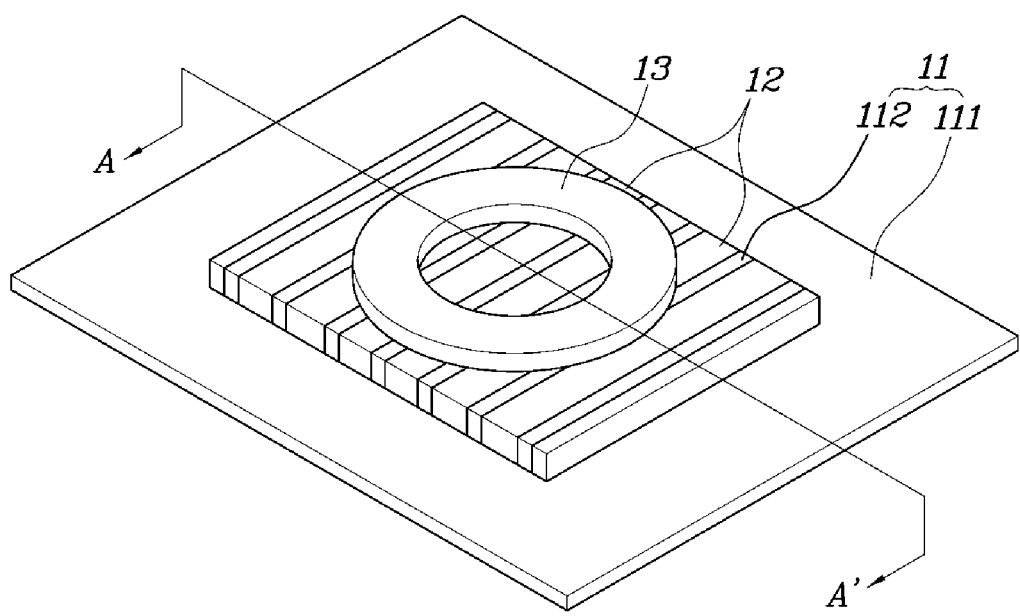
FIG. 1 is a perspective view illustrating a wireless charging device according to embodiments of the present disclosure.

A wireless charging device according to embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Referring now to the disclosed embodiments, FIG. 1 is a perspective view illustrating a wireless charging device according to embodiments of the present disclosure.

As shown in FIG. 1, the wireless charging device of the present disclosure includes a heat radiation panel 11, which has a radiation plate 111 and radiation fins 112 protruding from the upper surface of the radiation plate 111, core sections 12, which are arranged in regions except for the protruding radiation fins 112 on the upper surface of the radiation plate 111 and are made of a material having high permeability, and a coil section 13 which is arranged on the core sections 12 so as to come into contact with the radiation fins 112.

The heat radiation panel 11 is an element for dissipating heat transferred from the core sections 12 and the coil section 13, and may be made of a material having high thermal conductivity. The heat radiation panel 11 may include the radiation plate 111 and the radiation fins 112 protruding from the radiation plate 111. The radiation plate 111 and the radiation fins 112 may be integrally manufactured using the same material.

The radiation plate 111 may function as a substratum for disposing the core sections 12 and the coil section 13 on the upper surface thereof, and may simultaneously function to absorb and dissipate heat from the core sections 12 and the coil section 13. In addition, the radiation plate 111 may be made of a material having relatively high thermal conductivity and permeability so as to function to shield electromagnetic waves. For example, when the wireless charging device is applied to a primary coil used to transfer energy from a wireless charging system, the radiation plate 111 may shield a magnetic field generated by the primary coil from being transferred in the direction opposite to the arrangement direction of the primary coil, on the basis of the radiation plate 111. In addition, when the wireless charging device is applied to a secondary coil used to store the transferred energy in a battery, the radiation plate 111 may shield the magnetic field, which is generated by and transferred from the primary coil, from being transferred in the direction opposite to the arrangement direction of the secondary coil.

Figure 2:
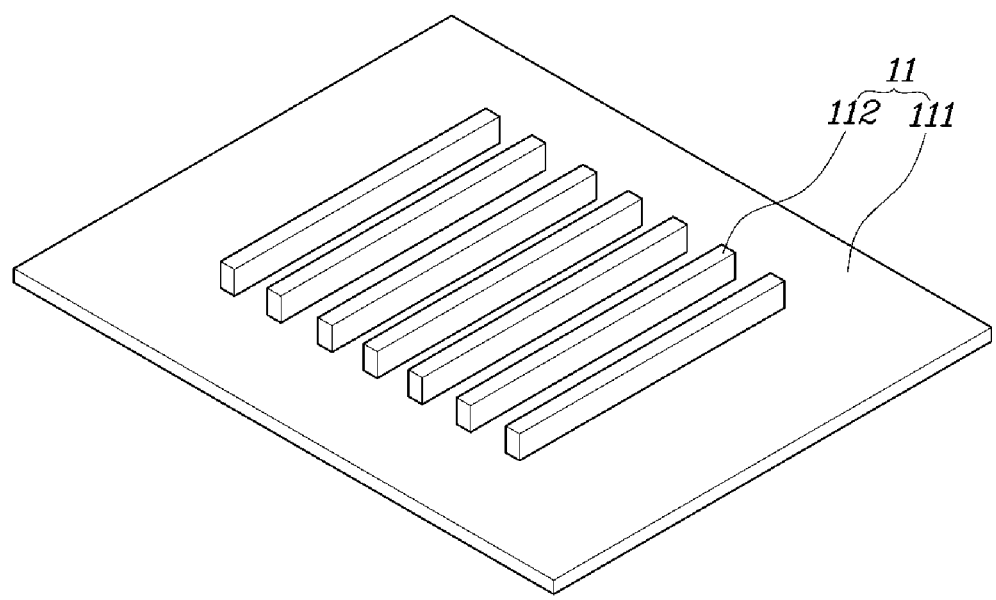
FIGS. 2 and 3 are perspective views illustrating various examples of heat radiation panels applied to the wireless charging device according to embodiments of the present disclosure.
Figure 3:
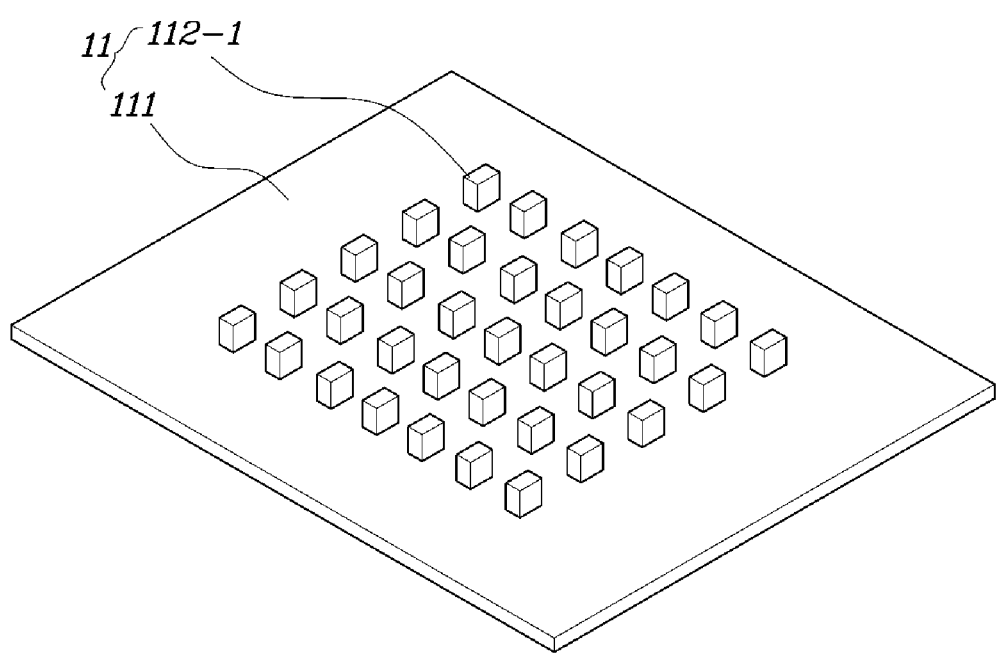

FIGS. 2 and 3 are perspective views illustrating various examples of heat radiation panels applied to the wireless charging device according to embodiments of the present disclosure.

The heat radiation panel illustrated in FIG. 2 may have a structure in which a plurality of radiation fins 112 is arranged in a strip pattern. That is, each of the radiation fins 112 has a rectangular shape in which a pair of facing sides on the underside has a relatively long length, and the radiation fins 112 having the rectangular shape may be arranged in parallel with each other at regular intervals so as to be arranged in the strip pattern.

The heat radiation panel illustrated in FIG. 3 may have a structure in which each of a plurality of radiation fins 112-1 has a hexahedral shape having a nearly square underside. The radiation fins 112-1 having the hexahedral shape may be arranged in a predetermined pattern on a radiation plate 111.

Since the radiation fins 112 and the radiation fins 112-1 are each formed in a predetermined pattern illustrated in FIGS. 2 and 3, the radiation fins 112 come into contact with a coil section 13 in a plurality of regions and the radiation fins 112-1 come into contact with a coil section 13 in a plurality of regions. As a result, contact areas may be increased.

Referring to FIG. 1 again, the core sections 12 serve to increase a magnetic flux density of the magnetic field generated by the coil section 13 and efficiently form a magnetic path of the magnetic field generated by the coil section 13. Each of the core sections 12 may be made of a material having high permeability. For example, the core section 12 may be made of a material such as ferrite or metal composite.

The coil section 13 may generate a magnetic field using a supplied current, or may output a current using an electromotive force induced by a magnetic field. That is, when the wireless charging device is applied to the primary coil used to transfer energy from the wireless charging system, the coil section 13 may generate the magnetic field using the flowing current, and when the wireless charging device is applied to the secondary coil used to receive the energy from the wireless charging system, the coil section 13 may generate the electromotive force induced by the magnetic field generated by the primary coil to supply the current to the battery using the electromotive force.

Although the coil section 13 is illustrated to have a flat cylindrical shape with a hollow in FIG. 1, this is for convenience only. In practice, the coil section 13 may have a structure in which a wire is wound at least one time in a circular or rectangular pattern on the upper surfaces of the core sections 12.

Figure 4:
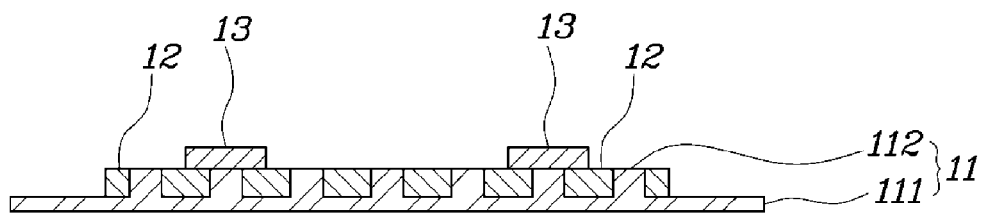
FIG. 4 is a side view illustrating the wireless charging device according to embodiments of the present disclosure.

FIG. 4 is a side view illustrating the wireless charging device according to embodiments of the present disclosure, and is a cross-sectional view taken along line "A-A" in FIG. 1.

As illustrated in FIG. 4, in the wireless charging device according to the embodiment of the present disclosure, the radiation fins 112 protruding from the upper surface of the radiation plate 111 are directly in contact with the coil section 13. Through such a structure, heat generated by the coil section 13 may be directly transferred to the radiation plate 112 having high thermal conductivity so as to efficiently dissipate through the radiation plate 111.

The radiation fins 112 may be flush with the core sections 12 on the basis of the upper surface of the radiation plate 111, such that the coil section 13 comes into contact with the radiation fins 112 with consideration of heat dissipation and simultaneously comes into contact with the core sections 12 to generate a magnetic field having a high magnetic flux density. That is, the upper surfaces of the radiation fins 112 and the upper surfaces of the core sections 12 may form a single surface.

In addition, in order to efficiently dissipate heat transferred to the core sections 12 from among heat of the core sections 12 themselves and heat generated by the coil section 13, the side surfaces of the radiation fins 112 may come into contact with the side surfaces of the core sections 12. Through such a structure, it is possible to further increase contact areas between the core sections 12 and the radiation plate 111 and radiation fins 112 and thus to further improve a heat dissipation effect.

In the radiation fin structure illustrated in FIG. 2, each of the core sections 12 may have a width corresponding to the distance between the radiation fins 112 arranged in the strip form, and the core sections 12 may include a plurality of blocks, each having the same height as the height of each radiation fin 112. That is, the core sections 12 may be standardized and manufactured in the form of a plurality of blocks having regular widths corresponding to regular distances between the radiation fins 112. Through such a structure, the side surfaces of the core sections 12 come into direct contact with the side surfaces of the radiation fins 112, and thus a heat dissipation effect may be improved. In addition, since the core sections 12 may be manufactured in a certain standard form, the manufacturing process of the core sections 12 may be simplified.

In the radiation fin structure illustrated in FIG. 3, since the radiation fins 112-1 are dispersed, the core sections 12 may be manufactured in the form of a plurality of blocks having different sizes with consideration of the distances between the radiation fins 112-1 so that the side surfaces of the radiation fins 112-1 come into direct contact with the side surfaces of the core sections 12. Accordingly, the manufacturing process of the core sections 12 in the wireless charging device having the radiation fin structure illustrated in FIG. 3 may be relatively complicated, compared to the wireless charging device having the radiation fin structure illustrated in FIG. 2. However, the wireless charging device having the radiation fin structure illustrated in FIG. 3 can form a higher magnetic flux density since separation regions between the core sections 12 are small, compared to the wireless charging device having the radiation fin structure illustrated in FIG. 2.

In accordance with a wireless charging device according to embodiments of the present disclosure, since radiation fins formed in a heat radiation panel having high thermal conductivity come into direct contact with a coil section, which generates the large amount of heat, the heat dissipation can be improved. In addition, since contact areas between core sections and the radiation fins are increased by direct contact between the side surfaces of the radiation fins and the side surfaces of the core sections, the heat dissipation in the core sections can be improved, as well. Furthermore, since the arrangement regions of the core sections are reduced due to the radiation fins arranged on a radiation plate for contact with the coil section, the amount of material required to manufacture the core sections can be reduced, and thus manufacturing costs can be reduced.

While the present disclosure has been described with respect to the specific embodiments, it will be apparent to those skilled in the art that various changes and modifications may be made without departing from the spirit and scope of the disclosure as defined in the following claims.

What is claimed is:

1. A wireless charging device comprising:
a heat radiation panel having a radiation plate and radiation fins protruding from an upper surface of the radiation plate;
a core section arranged in a region other than the protruding radiation fins, the core section being made of a material having high permeability; and
a coil section arranged on the core section so as to come into contact with the protruding radiation fins,
wherein the core section comes into direct contact with side surfaces of the radiation fins, and the coil section comes into direct contact with upper surfaces of the radiation fins,
wherein a plurality of regions of the coil section come into direct contact with the radiation fins,
wherein the radiation fins are flush with the core section such that the coil section simultaneously comes into contact with the radiation fins and the core section,
wherein the upper surfaces of the radiation fins and an upper surface of the core section together form one plane, and
wherein the coil section is arranged on the one plane formed by the upper surfaces of the radiation fins and the upper surface of the core section.

2. The wireless charging device of claim 1, wherein the radiation fins are configured as a plurality of radiation fins, each having a hexahedral shape.

3. The wireless charging device of claim 2, wherein the core section comes into contact with side surfaces of the plurality of hexahedral radiation fins, and the coil section comes into contact with upper surfaces of the plurality of hexahedral radiation fins.

4. The wireless charging device of claim 1, wherein the radiation fins are configured as a plurality of radiation fins, arranged at regular intervals in parallel with each other in a strip form.

5. The wireless charging device of claim 4, wherein the core section includes a plurality of blocks, each having a width corresponding to a distance between the plurality of radiation fins arranged in the strip form.

6. The wireless charging device of claim 1, wherein the upper surfaces of the radiation fins and the upper surface of the core section form the same single surface.

* * * * *